Jan. 3, 1939. V. C. DE YBARRONDO 2,142,183
METHOD OF SIMULTANEOUSLY PRODUCING TWO OR MORE TOTALLY
DIFFERENT PICTURES FROM ONE FILM STRIP
Filed Jan. 20, 1936 2 Sheets-Sheet 1
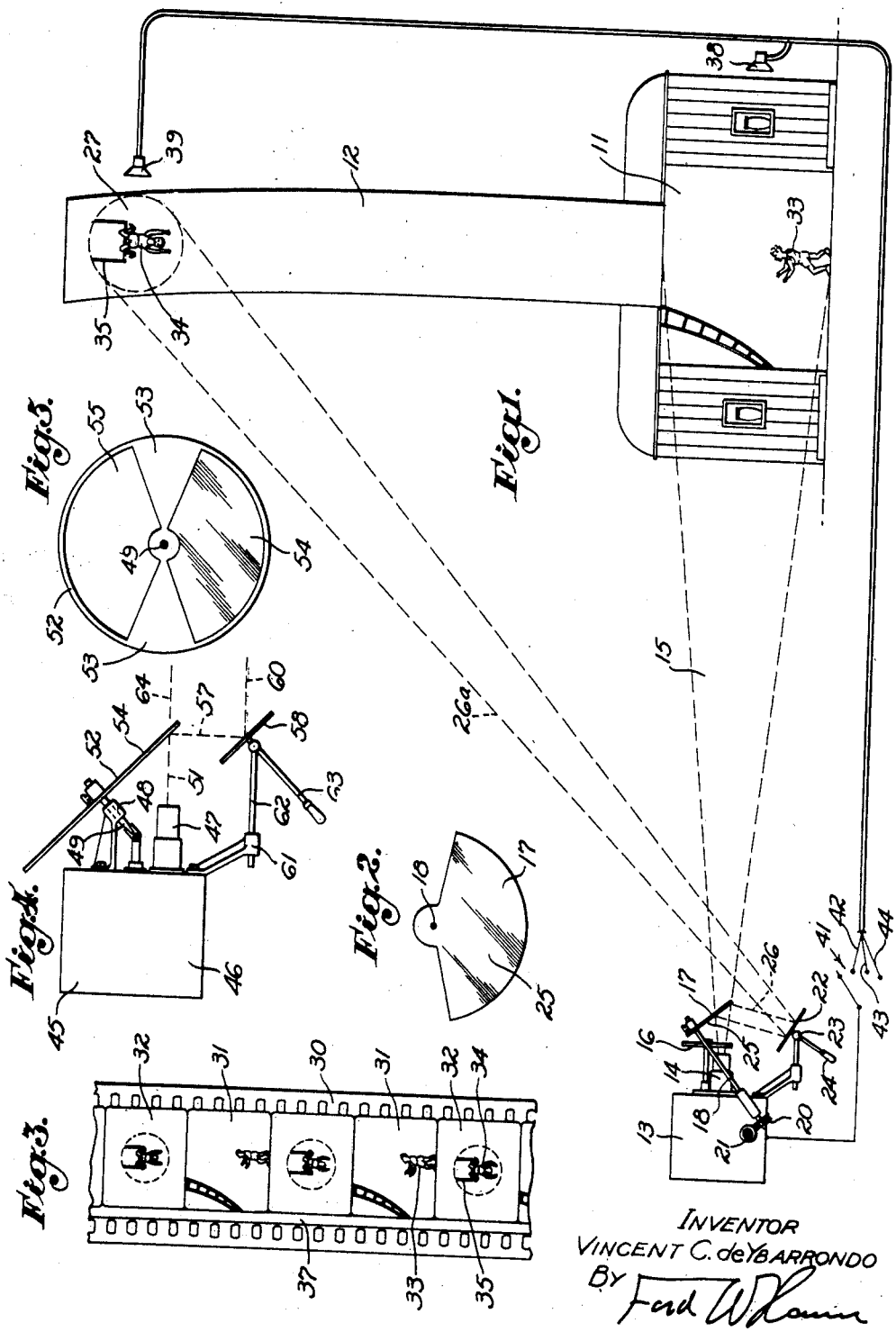
INVENTOR
VINCENT C. deYBARRONDO
BY
Ferd W Louis
ATTORNEY.

Jan. 3, 1939.　　　V. C. DE YBARRONDO　　　2,142,183
METHOD OF SIMULTANEOUSLY PRODUCING TWO OR MORE TOTALLY
DIFFERENT PICTURES FROM ONE FILM STRIP
Filed Jan. 20, 1936　　　2 Sheets-Sheet 2

INVENTOR
VINCENT C. de YBARRONDO
BY
Fred W Lanin
ATTORNEY.

Patented Jan. 3, 1939

2,142,183

UNITED STATES PATENT OFFICE 2,142,183

METHOD OF SIMULTANEOUSLY PRODUCING TWO OR MORE TOTALLY DIFFERENT PICTURES FROM ONE FILM STRIP

Vincent C. de Ybarrondo, Los Angeles, Calif., assignor to Patco, Inc., Los Angeles, Calif., a corporation of California Application January 20, 1936, Serial No. 59,836

3 Claims. (Cl. 88—16)

My invention relates in general to the art of producing and displaying motion pictures, and in particular relates to a method and apparatus whereby several totally different pictures, actions, or scenes may be projected from or displayed by a single film strip, whereas present practice requires separate film strips for the projection or displaying of separate actions or scenes of a motion picture drama or production.

In the present manner of displaying motion picture productions or dramas, the separate actions or scenes of which the production or drama is composed follow each other in consecutive order on a film. For the purpose of illustration, it may be said that a film of standard length, say 1000 feet, consists of a number of shorter strips connected together in end-to-end relation. The length of each of these shorter strips is defined by the length of the scene or action contained thereon. A length of film may have its first scene occupying 250 feet of film, its second scene occupying 150 feet of film, etc. Each of these scenes or actions therefore occupies a portion or strip of film which is separate from but may be connected to the portion or strip of film occupied by another scene of the motion picture production. In present motion picture productions five scenes each 200 feet in length require a length of film of 1000 feet to contain the same; but, in my present invention these scenes each running the same length of time, and having frames or images of standard size, may be contained upon a shorter length of film, for example, 500 feet, 334 feet, etc., as desired, due to the fact that in my present invention the images or frames of one scene or action are interspersed between the frames of another scene or action, as will be later described herein.

It is a further object of the invention to provide a novel motion picture film strip and means whereby several separate scenes or actions, or the same scene or action, may be projected to separate screen areas so as to be displayed thereon at the same time. The term "screen area" is herein used to define a surface or the like on which a motion picture scene or action is viewed. Such screen areas may consist of two separate and adjacent portions of a single large screen as employed in theaters or may consist of separate screens disposed in spaced relationship. A feature of my invention is that in projection the film strip is moved at standard speed necessary for proper sound reproduction, for example, 24 frames per second.

A further object of the invention is to provide a film strip or motion picture film in which two or more separate scenes are recorded by frames placed in alternating relation so that a frame showing one of the scenes will lie adjacent a frame showing another of the scenes. Herein I use the term "scene" broadly to include a sequence or action, or to include a number of consecutive photographs taken from a stage setting or scene found in nature without the presence of actors therein.

It is a further object of the invention to provide simple forms of apparatus whereby the projection of a motion picture production or drama may be accomplished in the manner above set forth and so as to produce the novel and startling effects such as suggested in the following part of the specification.

Further objects and advantages of the invention will be made evident throughout the following part of the specification.

Referring to the drawings, which are for illustrative purposes only,

Fig. 1 is a schematic view showing a projector embodying my invention, and a manner of projecting a motion picture production therefrom.

Fig. 2 is a face view of the mirror shutter employed in the projecting apparatus of Fig. 1.

Fig. 3 is a view of a small portion of a film strip having a plurality of motion picture scenes recorded thereon.

Fig. 4 is a plan view of an alternative form of projecting device.

Fig. 5 is a face view of the combined mirror and shutter employed in Fig. 4.

Figure 6:
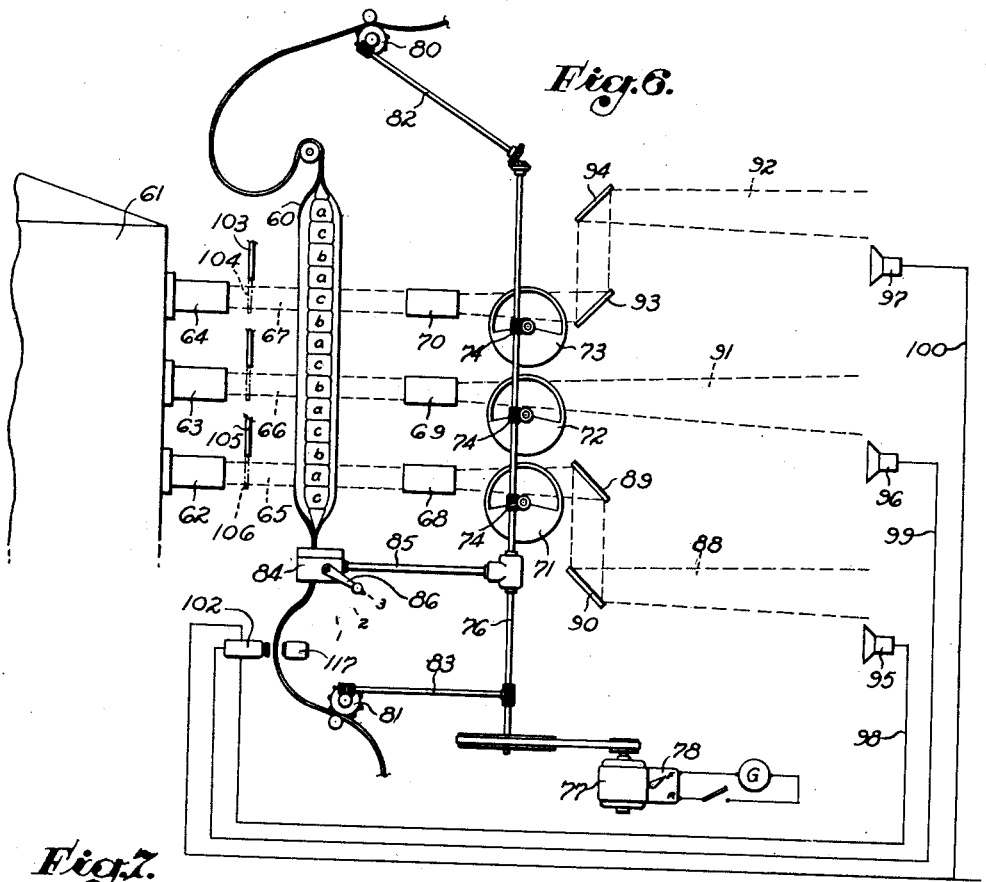
Fig. 6 is a schematic view of an alternative form of projector embodying my invention.

In Fig. 1 I show a screen 11 of customary rectangular size, such as employed upon the stage of a theater in ordinary motion picture production. Extending upwardly from the screen 11 is a screen 12 which may be considered an extension of the screen 11. The screens 11 and 12, however, constitute two separate screen areas, since in the practice of the invention two separate and distinct scenes or actions are displayed thereon. Also, in Fig. 1 I show schematically a standard type of projector 13 having an objective lens 14 adapted to project a motion picture image through a primary path 15 to the screen 11 which may be considered the primary screen.

As part of the standard equipment, the projector 13 has a shutter 16 for obstructing the passage of light during the movement of the film by the intermittent mechanism of the projector. In addition to the shutter 16, I mount upon the projector 13 a shutter 17 which may be carried by a diagonally disposed shaft 18 having gear means 20 by which it is driven from a gear 21 connected to the driving mechanism of the projector 13. Likewise, on the projector 13 I mount a mirror 22 supported by a flexible joint 23 and adapted to be swung by use of a handle 24. The shutter 17 rotates at half the speed of the shutter 16, and since the shutter 17 is shaped as shown in Fig. 2 it will obstruct the passage of alternate consecutive images.

In a preferred use of my invention the inner surface of the shutter 17 constitutes a mirror 25 which is disposed at such angle that it will deflect the image received thereby through a secondary path indicated by dotted lines 26, to the reflector 22 which deflects the light rays through a continuation of the secondary path 26a. The function of the mirror-shutter and the reflector 22 is accordingly to deflect each alternate consecutive image of a motion picture film to the secondary screen 12. Such image, indicated by the numeral 27, may be positioned at the upper end of the screen area 12 or at any other desired point in the screen area 12, or it may be caused to move from the position in which it is shown downwardly to the screen area 11 by swinging the reflector 22 through use of the handle 24. This ability to show two separate scenes simultaneously makes possible the production of many novel theatrical effects which may or may not take advantage of the ability to move one of the scenes relative to another of the scenes.

As an example of one of the novel effects to be produced by the practice of the invention, I show a motion picture record strip consisting of a film 30 having primary frames 31 and secondary frames 32 in alternating relation to the primary frames 31. The frames 31 are photographed from a scene consisting of an acrobat 33 standing upon a platform, or moving thereon as desired. The frames 32 are taken from another scene consisting of an acrobat 34 hanging from a trapeze 35. With the projector 13 of Fig. 1 properly adjusted, the scene represented by the frames or images 31 will be projected to the primary screen area 11, and the scene represented by the frames 32 will be projected to the upper part of the secondary screen area 12. The film strip 30 has a sound track 37 containing the voices of the actors, namely, the acrobats 33 and 34, and the sound reproducing system may include a pair of loud speakers 38 and 39 placed respectively behind the screen areas 11 and 12. A switch member 41 associated with cables 42, 43, and 44, which are in turn extended to the loud speakers 38 and 39, may be manipulated so as to direct the sound current of the sound reproducing system to either the loud speaker 38 or the loud speaker 39, or both, as desired. Accordingly, with the primary and secondary images directed as shown in Fig. 1, the sound reproducing system may reproduce the interchange of conversation between the acrobat 33 and the acrobat 34 relative to the proposed plunge of the acrobat 34 from the trapeze into the arms of the acrobat 33. The action of the scene 27 represented by the frames 32 may show the acrobat 34 leaving the trapeze 35, whereupon the deflector 22 may be rotated downwardly so as to cause the scene on the upper part of the secondary screen area to move downwardly, thereby giving the appearance of the acrobat 34 actually dropping into the arms of the acrobat 33. When the acrobat appears to reach the upper edge of the screen area 11, his image may be then projected from primary frames 31 of the film 32 directly through the primary path 15 to the primary screen area 11. On the other hand, the secondary scene, depicting the acrobat 34, may be continued downwardly from the lower edge of the secondary screen area 12 and across the upper portion of the primary screen area 11 until the image reaches the arms of the acrobat 33, whereupon the secondary image will be extinguished and the image of the acrobat 34 will appear on primary frames 31 of the film 30. Then, the picture projected through the primary path 15 from the primary frames 31 will contain both the acrobats 33 and 34. The foregoing illustration is a disclosure of one of the simplest uses of the invention and indicates the manner in which various novel effects may be obtained by the simultaneous projection of a pair of pictures on separate screen areas and the movement of one picture relative to the other picture.

In the operation of the invention, the film 30 is moved at the standard speed of 24 frames per second, so that a standard sound track is used wherein the velocity of the sound track relative to the photoelectric pickup will give sound effects as good as those now accepted in standard projection practice. Each scene contained on the film 30 will, however, use only 12 frames per second; therefore, the film strip may contain twice the number of scenes or twice the length of scenes as now employed on a motion picture film traveling at a velocity of 1½ feet per second, which corresponds to 24 frames per second. From the foregoing it will be recognized that by the use of my invention it is possible to project a plurality of scenes simultaneously from a film strip which in ordinary practice of motion picture production is capable of the projection of only one scene. Hereinafter I will describe how the invention may be employed to project a motion picture drama of multiple length from a single strip of film instead of multiple simultaneous scenes from a single film strip.

In Figs. 4 and 5 I show the manner in which a camera may be equipped with a single rotating shutter member embodying both the standard shutter and the deflecting mirror, which shutter and mirror were shown in Fig. 1 as constituting two separate parts. The projector 45 of Fig. 4 has a housing 46 containing the customary light source and film moving mechanism, together with the sound mechanism of electrical type. Projecting forwardly from the housing 46 is a projection lens 47, and to one side of the lens 47 is a journal 48 carrying a shaft 49 disposed preferably at an angle of 45° relative to the axis of the lens 47 as indicated by the dotted line 51. The shaft 49 rotates once for each two frames of film advanced in the projector 45, and on its outer end carries a rotary member 52 having two diametrally opposed walls forming shutters 53, a mirror 54, and an opening 55, which pass before the projection lens 47 as the member 52 is rotated. When the mirror 54 is in front of the lens 47, the light beam issued from the lens will be deflected through a path indicated by dotted lines 57 to a second mirror 58 which will in turn deflect the light beam forwardly as indicated by the dotted line 60. By means of a bracket 61 and a rod 62, the mirror 58 is adjustably supported and may be provided with a handle 63 whereby it may be swung through desired positions. The lines 57 and 60 may be said to constitute a secondary path of projection. When the opening 55 of the rotary member 52 is passing in front of the lens 47, the light beam carrying the motion picture image will pass straight ahead through a primary path as indicated by the dotted line 64.

In the projecting devices shown in Figs. 1 and 4, the primary and secondary frames, or the primary and secondary images, are projected through the primary and secondary paths alternately. It is also a part of the invention to provide a means whereby the primary and secondary frames may be projected simultaneously, and whereby more than two separate scenes may be shown on a screen or several screen areas at the same time.

In Fig. 6 I show a film strip 60 having primary frames a, secondary frame b, and tertiary frames c. The film strip 60 accordingly shows three groups of frames, each group being taken from a separate scene, the frames of these groups being interspersed and in consecutive order. In other words, frames a, b, and c are placed in consecutive order as shown, the arrangement a, b, and c being repeated throughout the length of the film strip 60. Fig. 6 diagrammatically depicts a projecting apparatus having a light housing 61 provided with primary, secondary, and tertiary light emitting members 62, 63, and 64 spaced apart at such distance that the member 62 will pass a light beam 65 through a primary frame a, the member 63 will pass a light beam 66 through a secondary frame b, and the member 64 will pass a light beam 67 through a tertiary frame c. The light beams 65, 66, and 67 after passing through the film as shown are carried through projection lenses 68, 69, and 70 with which shutters 71, 72, and 73 are associated, such shutters being driven through gears 74 from a drive shaft 76 which is driven by a motor 77 having a reversing switch 78. Film guide sprockets 80 and 81 are provided and are arranged to be driven respectively by shafts 82 and 83 connected in a suitable manner with the drive shaft 76. I have diagrammatically shown an intermittent film advancing mechanism 84 which is driven through a shaft 85 connected with the shaft 76. This film advancing mechanism 84 is of adjustable character so that it will advance the film one frame at a time, two frames at a time, or three frames at a time, in accordance with the position of the gear shifting or control lever 86 associated therewith. In the operation of the device with a film of the character shown in Fig. 6, the film is advanced three frames at a time. When the film 60 is in the position shown, an image a will be projected through a primary path 88 including a pair of deflecting mirrors 89 and 90. The image of a frame b will be projected straight ahead through a secondary path 91, and the image of a frame c will be projected through a tertiary path 92 which employs deflecting mirrors 93 and 94. The primary, secondary, and tertiary images are projected through separate paths 88, 91, and 92 to separate screen areas, and if desired a separate loud speaker 95, 96, or 97 may be employed with each of the screen areas. These loud speakers are respectively shown connected through cables 98, 99, and 100 with a sound take-off element 102, of electrical character, past which the film 60 passes in the customary manner employed in modern sound motion picture projecting devices. Since the film 60 is advanced three frame at a time, images of frames a, b, and c will always be brought respectively into projecting positions before the primary, secondary, and tertiary lenses 68, 69, and 70.

In the foregoing I have described how three separate images, or three separate scenes, may be projected to three separate screen areas at the same time. The apparatus shown in Fig. 6 may be used to project two images simultaneously or may be used to project standard film in which only one scene is projected at a time. The intermittent advancing mechanism may be adjusted so that it will move the film 60 two frames at a time, and the light from one of the light emitting members 62, 63, or 64 may be discontinued or interrupted, as by the moving of a shutter 103 downwardly into the position indicated by dotted lines 104. The apparatus shown in Fig. 6 may be then employed to project a film such as shown in Fig. 3, in which there are two groups of images arranged for the projection of two scenes at one time. By readjusting the intermittent film advancing mechanism 84, so that it will move the film 60 one frame at a time, and shutting off another of the light sources, as by lowering a shutter 105 to the dotted line position 106, the apparatus may be placed in condition for the projection of standard film, the images of which will now be all projected through the central path of projection 91.

Figure 7:
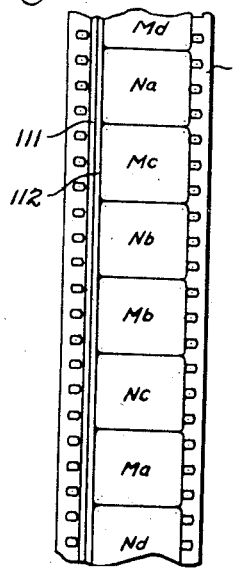
Fig. 7 is a view of a portion of a film having a plurality of sound tracks thereon and having frames in alternating relation.

In another use of the invention, only one scene may be shown at a time, but a greater length of motion picture production or drama may be projected from a given length of motion picture film. For example, as shown in Fig. 7, I show a film strip 110 having a group of images M, and a second group of images N. The film strip 110 is run through the projector so as to first project the images of the frames M, skipping the frames N which are disposed between the frames M. The film 110 will be then again run through the projector so as to project the images of the frames N, but at this time skipping the frames M. So that it will not be necessary to rewind the film each time it is run, the frames M may be extended in consecutive order from the front end of the film 110 to the rear end thereof, as indicated by Ma, Mb, and Mc in Fig. 7, and the frames N may be extended in reverse direction from the rear end of the film to the front end thereof, as indicated by Na, Nb, Nc, and Nd. Accordingly, the film 110 may be run through the projector in forward direction, during which time each alternate frame M will be projected, and then without taking the film from the projector its direction may be reversed, and during the reverse movement of the film 110, the alternate frames N may be projected.

Figure 8:
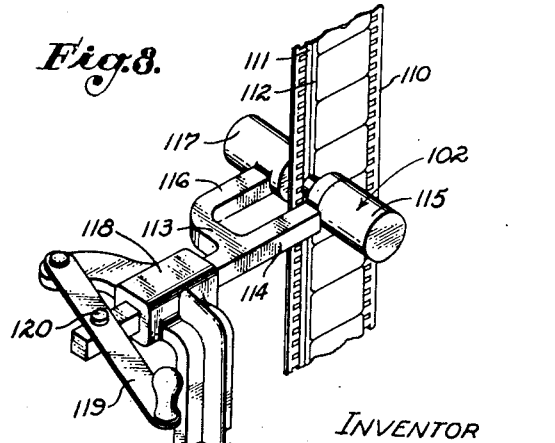
Fig. 8 is a perspective view showing the manner in which the sound pickup is adjusted.

The film 110 is moved through the camera at standard speed, that is, 24 frames per second, but of each foot of the film only half of the frames will be projected during its forward movement, whereas the remaining half of the frames will be projected during the rearward movement of the film. Under these conditions, with the film moving at a speed corresponding to 24 frames per second, only 12 frames per second will be projected during each direction of movement of the film, and the total length of time consumed in the projection of all of the frames contained on the film will be twice that used in the projection of a motion picture film of the same length, the result being that for a motion picture production of a given length, only one-half the amount of film customarily used need be employed in the practice of my invention.

Where a plurality of groups of frames are placed on a single film, but the groups or the scenes contained therein are projected singly as described in the preceding paragraph, my invention provides a plurality of sound tracks preferably corresponding in number to the number of times the film is to be run through the projector to show all of the images contained thereon. In Fig. 7 I show two sound tracks 111 and 112 on the film, one of these sound tracks being employed when the first group of images M are being projected, and the other of the sound tracks being used when the second group of images N are being projected. It is likewise a feature of the invention to provide a projector such as disclosed in Fig. 1, 4 or 6 having a sound pickup which may be adjusted so as to operate in conjunction with any one of a plurality of sound tracks upon the film. In Fig. 8 I show such a pickup as consisting of a forked supporting member 113 having an arm 114 carrying a casing 115 in which a glow tube is supported, and having an arm 116 carrying a casing 117 which contains the photoelectric cell, the casings 115 and 117 being in axial alignment and on opposite sides of the film 110. The support 113 is slidably mounted in a block 118, and means are provided in the form of a lever 119 having pivotal connection at 120 with the member 113 for the purpose of moving the same back and forth in the slide 118 so as to cause the sound pickup represented by the members 115 and 117 to move laterally relative to the film 110 into a position of cooperation with the desired sound track 111 or 112.

If the film shown in Fig. 7 is projected by use of the projector shown in Fig. 1, the mirror-shutter 17 may be replaced by a shutter of the same shape but having the surface thereof coated with a black substance. On the other hand, the deflecting mirror 22 may be removed from the position in which it is shown so that each alternate image will not be deflected forwardly into the theater. When the film 110 of Fig. 7 is projected in the projecting apparatus shown in Fig. 6, the intermittent advancing mechanism 84 will be adjusted so as to move the film two frames at a time, but only one of the light emitting members 62, 63, or 64 will be left uncovered. Preferably the central member 63 will be left uncovered, and the alternate images will be projected through the lens 69 and the direct path of projection 91.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. A method of displaying two or more different pictures from one film strip, which consists of: projecting selected images through a normal path of projection to a primary screen; alternately projecting the other images through a deflected path to a secondary screen; moving said deflected images on said secondary screen relative to said primary screen in accordance with a sequence of action portrayed thereon; and moving said deflected images into said images projected on said primary screen to form a component part thereof.

2. A method of displaying motion pictures, which consists of: projecting selected images through a primary path to a primary screen; intermittently intercepting the primary path of projection; deflecting other images through a secondary path to a secondary screen; moving said deflected images on said secondary screen relative to said primary screen in accordance with a sequence of action portrayed thereon; and moving said deflected images into said images projected on said primary screen to form a component part thereof.

3. A method of displaying motion pictures, which consists of: projecting selected images through a primary path to a primary screen; intermittently intercepting the primary path of projection; deflecting other images through a secondary path to a secondary screen; and moving said deflected images on said secondary screen relative to said primary screen in accordance with a sequence of action portrayed thereon.

VINCENT C. DE YBARRONDO.